US007788935B2

(12) United States Patent
Jang et al.

(10) Patent No.: US 7,788,935 B2
(45) Date of Patent: Sep. 7, 2010

(54) AUTOMATIC DEFOGGING SYSTEM OF VEHICLE AND CONTROL METHOD THEREOF

(75) Inventors: Ki Lyong Jang, Suwon-si (KR); Chang Won Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 951 days.

(21) Appl. No.: 11/589,471

(22) Filed: Oct. 30, 2006

(65) Prior Publication Data

US 2007/0130972 A1    Jun. 14, 2007

(30) Foreign Application Priority Data

Dec. 13, 2005    (KR) .................... 10-2005-0122455

(51) Int. Cl.
*F25D 21/00*    (2006.01)
*F25B 49/00*    (2006.01)
(52) U.S. Cl. .................. 62/150; 62/176.2; 62/176.6; 236/44 C; 165/231
(58) Field of Classification Search ................. 62/176.1, 62/176.2, 150, 176.6; 236/44 R, 44 A, 44 C; 165/231
See application file for complete search history.

(56) References Cited

U.S. PATENT DOCUMENTS

| | | | | | |
|---|---|---|---|---|---|
| 4,852,798 | A | * | 8/1989 | Ito et al. ..................... 237/2 A |
| 4,910,967 | A | * | 3/1990 | Takahashi .................. 62/176.1 |
| 5,514,035 | A | * | 5/1996 | Denniston ................... 454/121 |
| 5,516,041 | A | * | 5/1996 | Davis et al. ................. 236/49.3 |
| 6,971,584 | B2 | * | 12/2005 | Schmitt et al. ............ 236/44 R |
| 7,222,666 | B2 | * | 5/2007 | Homan et al. ............... 165/202 |
| 7,331,531 | B2 | * | 2/2008 | Ruttiger et al. ........... 236/44 C |
| 7,337,622 | B2 | * | 3/2008 | Wang et al. .................... 62/150 |
| 2002/0084336 | A1 | * | 7/2002 | Shin ......................... 236/44 R |

FOREIGN PATENT DOCUMENTS

JP    2001-213152    8/2001

* cited by examiner

*Primary Examiner*—Marc E Norman
(74) *Attorney, Agent, or Firm*—Morgan, Lewis & Bockius LLP

(57) ABSTRACT

An automatic defogging system of a vehicle according to an exemplary embodiment of the present invention includes: an input unit used for receiving a directly sensed window relative humidity value from a defogging sensor so as to directly sense a humidity generation degree in a window; a controller which controls operations of an air conditioning system programmed as a type of a logic that is selectively and phasedly controllable depending on the sensed relative humidity and; an output unit that is a selection mode of the air conditioning system that can be controlled by the controller. Accordingly, an automatic defogging system of a vehicle and a control method thereof automatically removes fog or frost on an inner surface of a window while maintaining comfortable conditions inside a vehicle.

2 Claims, 4 Drawing Sheets

Flowchart of an Air Conditioning Device when the Humidity near a Window inside a Vehicle Increases in an Automatic Defogging System Flowchart of an Air Conditioning Device when the Humidity near a Window inside a Vehicle Increases in an Automatic Defogging System Flowchart of an Air Conditioning Device when the Humidity near a Window inside a Vehicle Decreases in an Automatic Defogging System

AUTOMATIC DEFOGGING SYSTEM OF VEHICLE AND CONTROL METHOD THEREOF

CROSS-REFERENCE TO RELATED APPLICATION

This application claims priority to of Korean Patent Application No. 10-2005-0122455 filed in the Korean Intellectual Property Office on Dec. 13, 2005, the disclosures of which are incorporated herein by reference.

BACKGROUND OF THE INVENTION (a) Field of the Invention

The present invention relates to an automatic defogging system of a vehicle and a control method thereof. In particular, the present invention provides automatic defogging system of a vehicle and a control method thereof automatically removing fog or frost on an inner surface of a window while maintaining comfortable conditions inside the vehicle.

(b) Description of the Related Art

An air conditioning system makes comfortable conditions for occupants in a vehicle by removing fog or frost on the window. An air conditioning system includes an air ventilation device, an air conditioner, and a defrost switch included in the air conditioner.

The air ventilation device is divided into a spontaneous ventilation type which brings in air from the outside and sends the outer air into the vehicle by a pressure difference generated by vehicle driving and a compulsory ventilation type using a blower. The air conditioner adopts the compulsory ventilation type.

It is configured such that the hot air flows downward and the cold air flows upward or moves along a surface of a window from an outlet in order to removing fog on an inner surface of a window. The occupant can regulate air flow within the vehicle by controlling the opening and closing of a duct.

The duct controls operations of respective elements constituting an air conditioning system. The duct is controlled by switches located in an instrument panel such as a blower switch, a mode switch, and a heating/cooling switch.

By controlling the air conditioning system, the conditions in the vehicle are comfortable. In particular, the defrost switch is a device that removes humidity, fog or frost on a window. In particular, humidity, fog or frost can be removed thereby securing a view of an occupant.

An air conditioning system removes concentrated humidity or prevents the concentration of humidity, as shown in FIG. 1. FIG. 1 includes an input unit 1 which sends out electrical signals from a window surface temperature sensor which detects the temperature of the surface of a window and an interior humidity sensor detects the humidity in a vehicle; a controller 2 which includes an air conditioning system that is programmed to a specific logic and selectively and phasedly is controlled based on a difference between a window surface temperature value detected by the window surface temperature sensor and a dew-point temperature calculated by the detected value of the interior humidity sensor, and an output unit 3 that is a selection mode of an air conditioning system that can be controlled by the controller 2. In this application, "sensed" and "detected" are used interchangeably. Additionally, a control unit comprises a processor, a memory, and associated hardware and software as may be selected and programmed by persons of ordinary skill in the art based on the teachings of the present invention contained herein.

By operating an air cooling function or an air heating function according to the weather, the concentrated humidity on a window can be automatically removed or the concentration of humidity can be prevented.

However, since the humidity of the window is estimated by the temperature value detected by the window surface temperature and an interior humidity value detected by the interior humidity sensor, an accurate humidity value cannot be obtained.

In addition, since the defrost door cannot be independently controlled, a temperature change inside the vehicle may occur.

If a driver uses the control logic of the conventional air conditioning system, a driver may feel alienation according to a mode operation, and it is quite difficult to maintain a room temperature.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an automatic defogging system of a vehicle which includes a window humidity sensor installed on the inner surface of a window and phasedly operates an air conditioning system by a humidity removing logic depending on the detected signal thereby removing humidity and a control method.

An exemplary embodiment of the present invention provides an automatic defogging system of a vehicle which includes an input unit receiving a directly detected window relative humidity value from a defogging sensor so as to directly sense a humidity generation degree in a window; a controller which controls operations of an air conditioning system that is programmed in a specific logic that is selectively and phasedly controlled depending on the detected relative humidity and; an output unit that is a selection mode of the air conditioning system that can be controlled by the controller.

The controller may control an intake door allowing dry outer air to flow into a vehicle. A blower regulates an amount of the outer air which flows into the vehicle. An air conditioner supplies cool or hot air in which humidity is removed into the passenger room. A mode door sends out all air toward a window thereby maximally removing humidity. In case of excessive humidity within the vehicle, the defrost door sends out a portion of air toward the window while maintaining the temperature in the vehicle thereby removing humidity.

The defrost door may be independently controlled.

A control method of an automatic defogging system of a vehicle according to an embodiment of the present invention includes detecting a window relative humidity value, comparing the sensed window relative humidity value to a reference value, removing humidity by selectively operating a selection mode of an air conditioning system based on the comparison of the sensed window relative humidity to the reference value, and controlling a temperature in the vehicle.

When the window relative humidity in the vehicle increases, humidity is removed by: if the sensed value is greater or equal to value c and less than value d, the intake door and the defrost door is opened; if the sensed value greater than or equal to d and less than value g, the defrost door is fully opened, the air conditioner is operated, and the amount of air of a blower is increased; if the value is greater than or equal to g and less than value h, the defrost mode is converted and an amount of air is increased from the blower; if the sensed value is greater than or equal to value h, the amount of air of the blower is maximally increased, and; if the reference value is less than or equal to value a, the system goes to room temperature. The value a is about 55 to about 65%, the value c is about 65 to about 75%, the value d is about 70 to about 80%, the value g is about 85 to about 95%, and the value h is about 90 to about 100%.

When the window relative humidity in the vehicle decreases, the removing humidity may include: if the sensed value is greater than the value f, the intake door and defrost are opened, the air conditioner and defrost is operated and, amount of air of a blower is maximally increased; if the sensed value is less than or equal to the value f and greater than to the value e, the amount of blower is decreased; if the sensed value is less than or equal to the value e and greater than to a value b, the defrost mode is released and returns to a fully automatic temperature control ("FATC") state and further decreases an amount of air of the blower; if the sensed value is less than or equal to the value b and greater than to a value a, the system turns to the FATC state by minimizing an amount of air of the blower and closing the defrost door and; if the sensed value is less than or equal to the value a, the system goes back to room temperature. The value a is about 55 to about 65%, the value b is about 60 to about 70%, the value e is about 75 to about 85%, and the value f is about 80 to about 90%.

DETAILED DESCRIPTION OF THE EMBODIMENTS

An exemplary embodiment of the present invention will hereinafter be described in detail with reference to the accompanying drawings.

Figure 1:
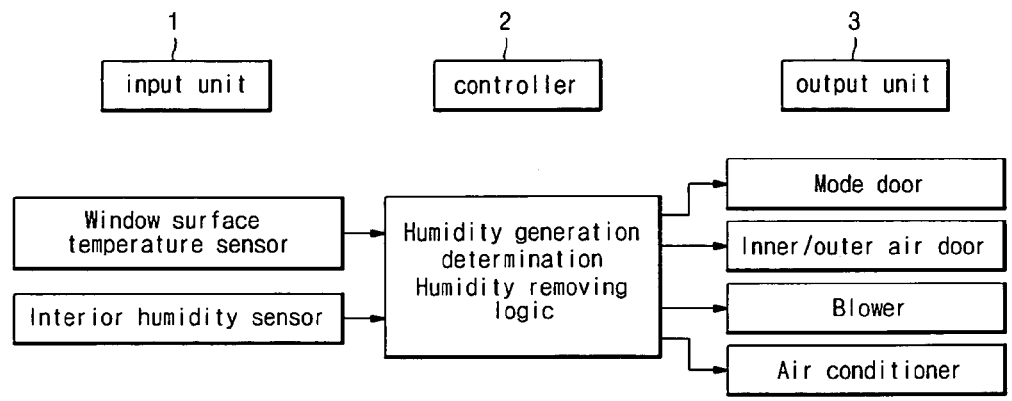
FIG. 1 is a block diagram showing the conventional control process of an air conditioning system for automatically defogging windows in a vehicle.
Figure 2:
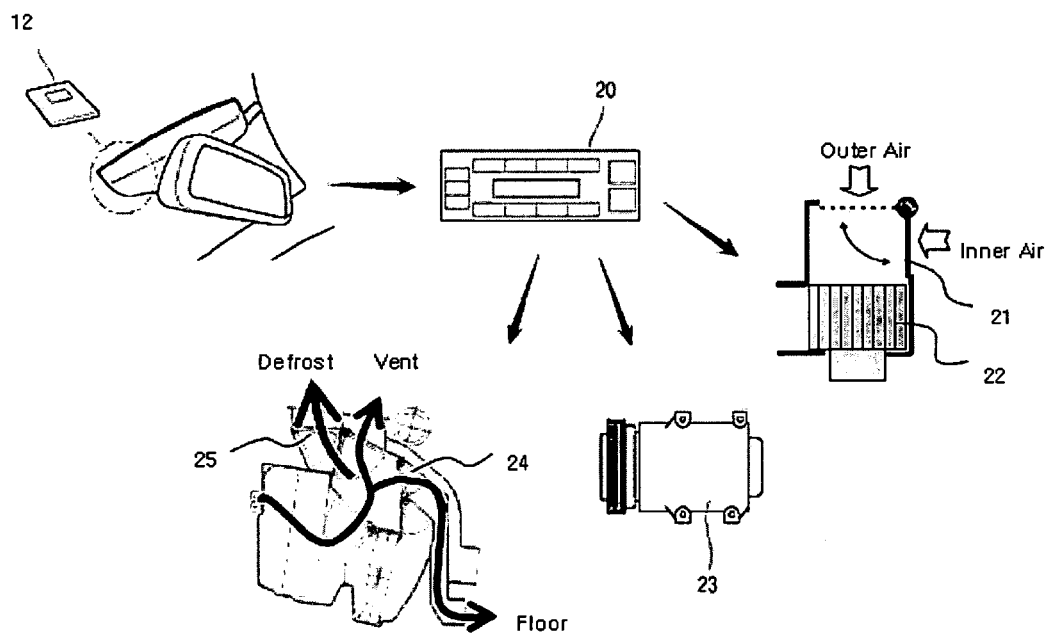
FIG. 2 is a drawing showing an automatic defogging system of a vehicle according to an embodiment of the present invention.

As shown in FIG. 2, a defogging sensor 12 installed on an inner surface of a window of a vehicle senses a relative humidity and outputs a corresponding signal in an automatic defogging system of a vehicle. A controller 20 receives the signal output from the defogging sensor 12 and outputs a control signal. An air conditioning system is selectively and phasedly operated by a defogging logic according to the output control signal of the controller 20, thereby automatically removing humidity.

Figure 3:
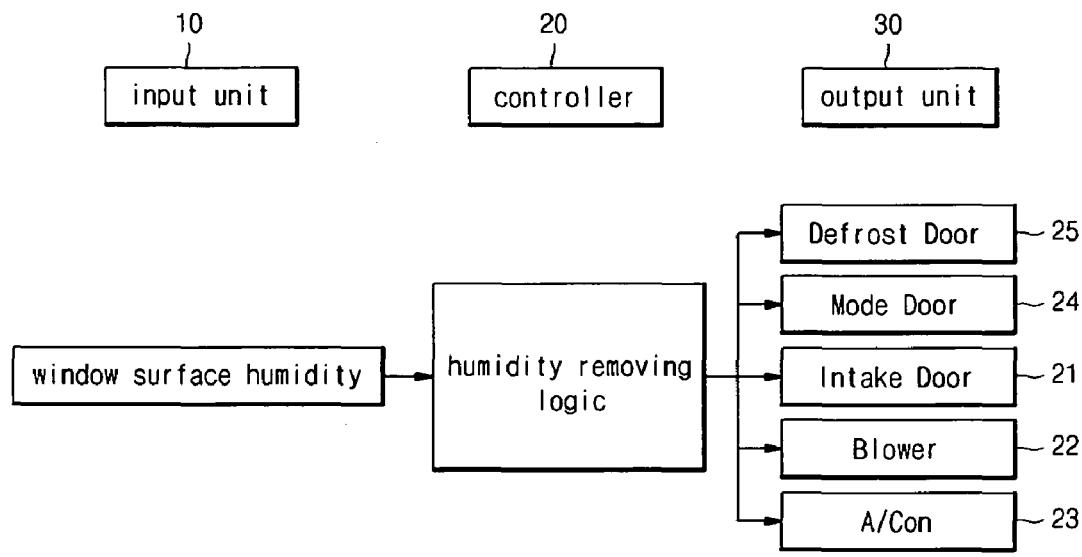
FIG. 3 is a block diagram showing a control process of an automatic defogging system of a vehicle according to an embodiment of the present invention.

As shown in FIG. 3, an input unit 10 receives a window relative humidity value, which is directly detected, from the defogging sensor 12. The controller 20 controls the operations of an air conditioning system which is programmed as a type of a logic that is selectively and phasedly controllable depending on the sensed relative humidity value. In an output unit 30, a selection mode of an air conditioning system that can be operated by the controller 20 is operated thereby automatically removing humidity on the inner surface of a window.

The humidity removing logic of the controller 20 controls the operation of the air conditioning system which is configured to control an intake door 21, a blower 22, an air conditioner 23, a mode door 24, and a defrost door 25. In addition, the humidity removing logic is added to logic of a FATC device that is currently used so as to remove frozen and concentrated humidity on the surface of a window.

Air conditioning devices controlled by the controller 20 will be briefly explained hereinafter.

If the intake door 21 is set to be open in an outer air intake mode, dry outer air flows into a vehicle, such that the dry air is mixed with inner moist air thereby removing humidity.

The blower 22 increases or decreases an amount of outer air flowing into the vehicle in order to remove humidity.

The air conditioner 23 regulates a temperature in a vehicle by supplying cool or hot air in which humidity is removed from the vehicle, thereby removing humidity within the passenger room.

The mode door 24 sends out air toward a window thereby maximally removing humidity in the vehicle.

The defrost door 25 continuously sends out air to a vent so as to maintain a temperature in the vehicle. When the defrost door is open, it sends out a portion of air toward the window thereby removing humidity.

In addition, the defrost door 25 is independently controlled by the controller 20.

Operating states of the air conditioning system are automatically and phasedly controlled according to the amount of humidity inside the window by the controller 20. This will be explained hereinafter with reference to FIG. 4 to FIG. 6.

First, when the relative humidity inside the window in a vehicle increases, the operating states of the air conditioning system will be explained with reference to FIG. 4 and FIG. 5.

A symbol a stated below indicates about 55 to about 65% of the relative humidity. A symbol b stated below indicates about 60 to about 70% of the relative humidity. A symbol c stated below indicates about 65 to about 75% of the relative humidity. A symbol d stated below indicates about 70 to about 80% of the relative humidity. A symbol e stated below indicates about 75 to about 85% of the relative humidity. A symbol f stated below indicates about 80 to about 90% of the relative humidity. A symbol g stated below indicates about 85 to about 95% of the relative humidity. A symbol h stated below indicates about 90 to about 100% of the relative humidity.

A relative humidity of an inner surface of a window is sensed by the defogging sensor 12 at step S10. The sensed value is compared to a reference interior humidity value (a~h) at step S20.

Subsequently, at step S30, it is determined that the sensed relative humidity value is less than the value c.

If the sensed value is not less than the value of value c at step S30, then it is determined whether the sensed value is greater than or equal to the value c and less than the value d at step S31. If the sensed relative humidity value is greater than or equal to the value c and less than the value d, the control process enters into a defogging control mode. In other words, the intake door 21 is converted to an outer air intake mode, and the defrost door 25 begins to be open, at step S32.

If the sensed relative humidity value is not greater than or equal to the value c and less than the value d at step S31, then it is determined whether the sensed relative humidity value is greater than or equal to the value d and less than the value g at step S33. If the sensed relative humidity value is greater than or equal to the value d and less than the value g at step S33, the defrost door 25 is fully opened, the air conditioner 23 is operated, and an amount of air of the blower 22 is increased, at step S34. As the relative humidity at the window increases, an amount of air of the blower 22 is further increased.

If the sensed relative humidity value is not greater than or equal to the value d and less than the value g at step S33, it is determined whether the sensed relative value humidity value is greater than or equal to the value g and less than the value h at step S35. If the sensed relative value humidity value is greater than or equal to the value g and less than the value h at step S35, the control mode is converted to a defrost mode, and an amount of air of the blower 22 is further increased, at step S36.

If the sensed relative value humidity value is not greater than or equal to the value g and less than the value h at step S35, it is determined whether the sensed relative humidity value is greater than or equal to the value h at step S37. If the sensed relative humidity value is greater than or equal to the value h at step S37, an amount of air of the blower 22 is controlled to be a maximum value (e.g., 10V) at step S38. If the sensed relative humidity value is not greater than or equal to the value h at step S37, the control proceeds back to step S31.

Figure 4:
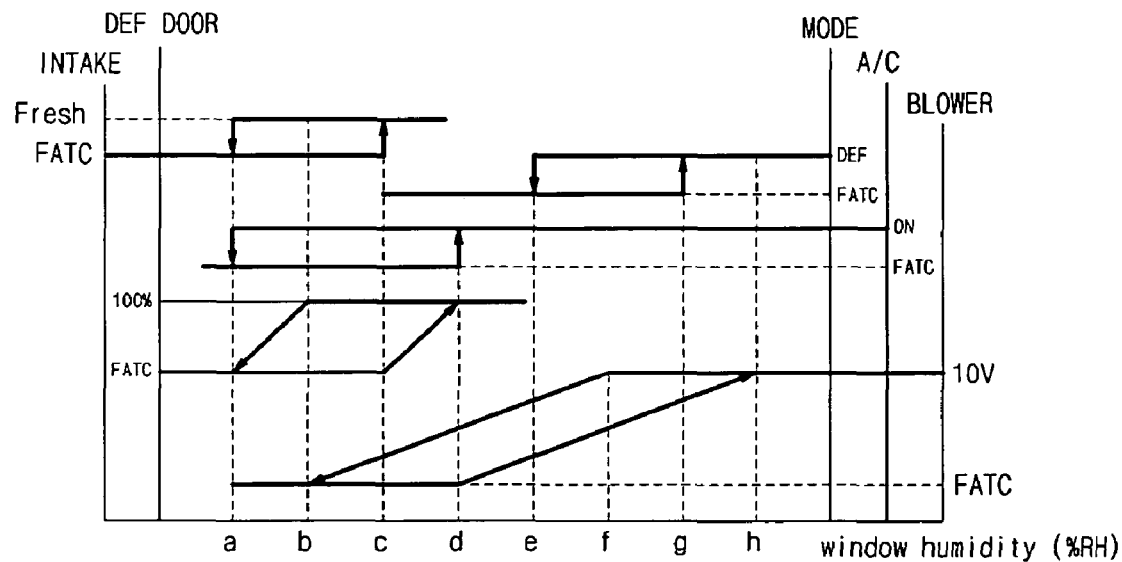
FIG. 4 is a logical diagram for controlling an air conditioning device of an automatic defogging system of a vehicle according to an embodiment of the present invention.
Figure 5:
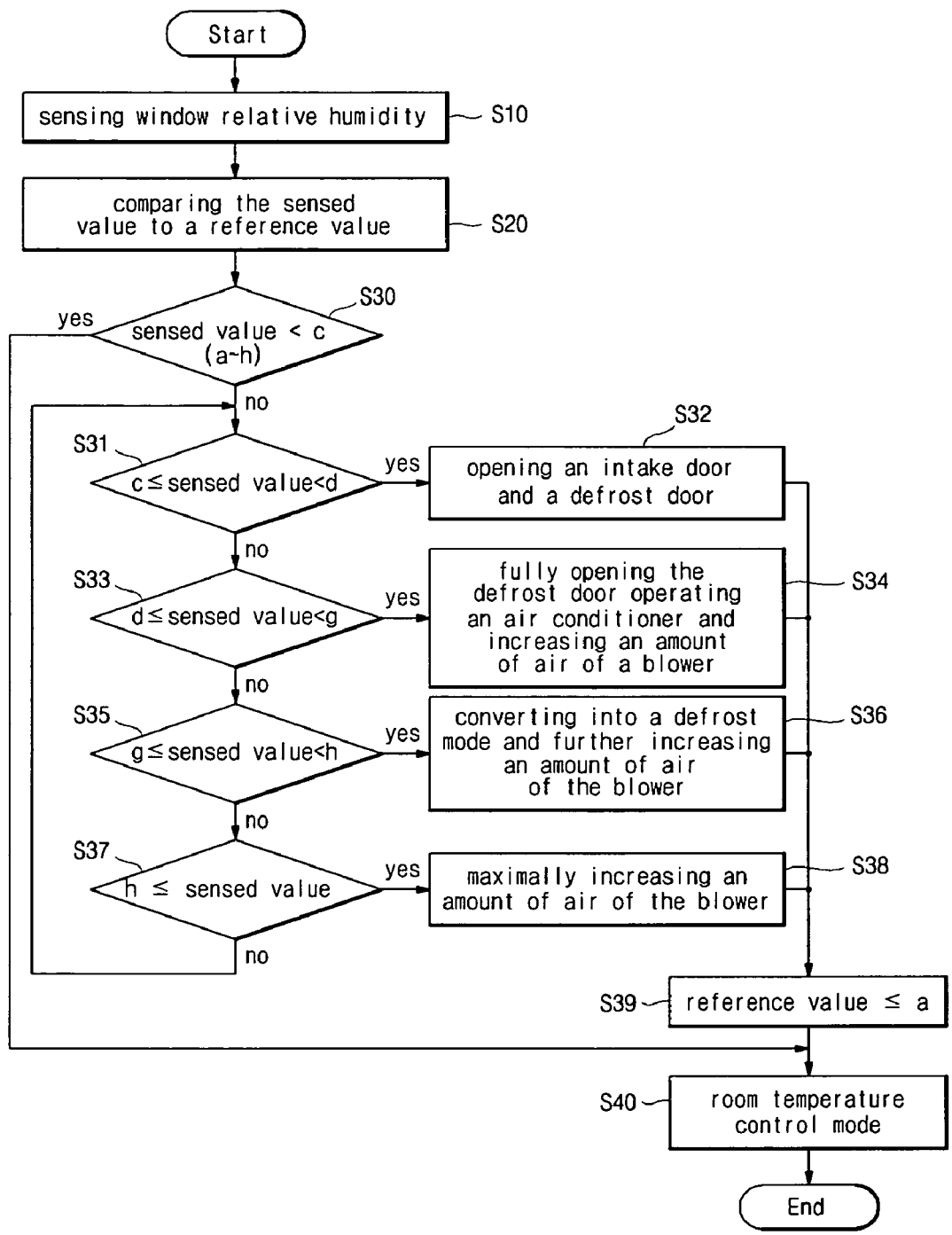
FIG. 5 is a flowchart of an air conditioning device when humidity near a window inside a vehicle increases in a control method of an automatic defogging system of a vehicle according to an embodiment of the present invention.

By selectively and phasedly controlling the air conditioning system, the air conditioning system is controlled along a descent line (referring to a logic shown in FIG. 4). If the relative humidity becomes less than or equal to the value a at step S39, the defogging mode is released and the control mode returns to a room temperature control mode at step S40.

Meanwhile, if the sensed relative humidity value is less than value c, the control procedure proceeds to step S40.

Figure 6:
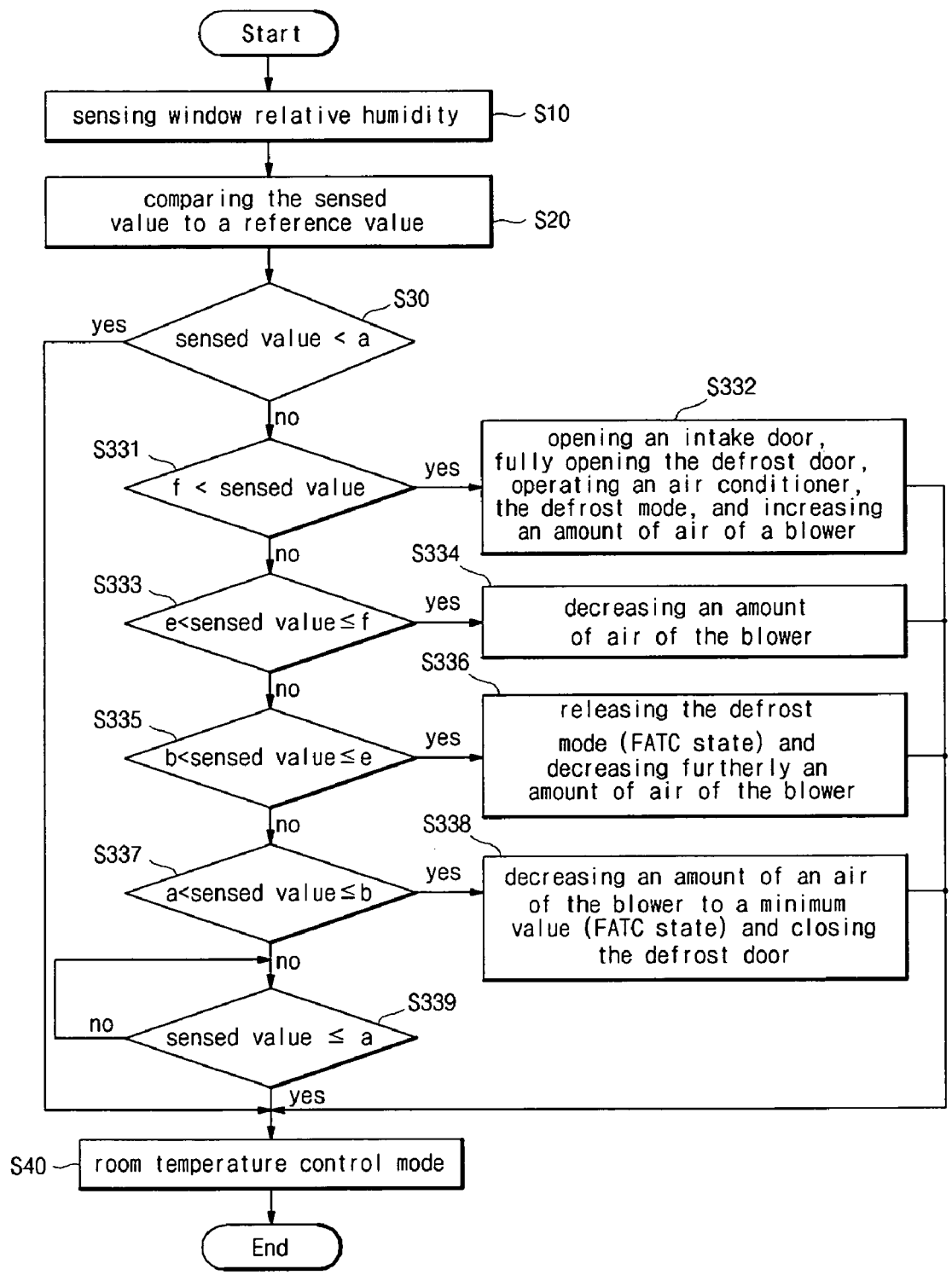
FIG. 6 is a flowchart of an air conditioning device when humidity near a window inside a vehicle decreases in a control method of an automatic defogging system of a vehicle according to an embodiment of the present invention.

On the other hand, when the relative humidity inside the window in a passenger room decreases, the operating states of the air conditioning system are explained with reference to FIG. 4 and FIG. 6.

A relative humidity of an inner surface of a window is sensed by the defogging sensor 12 at step S10, and then the sensed value is compared to a reference interior humidity value (a~h) at step S20.

Subsequently, at step S30, it is determined whether the sensed relative humidity value is less than the value a. If the sensed relative humidity value is less than the value a, then the system proceeds to step S40.

If the sensed relative humidity value is not less than the value a, it is determined whether the sensed relative humidity value is greater than the value f at step S331. If the sensed relative humidity value is greater than the value f at step S331, then the system proceeds to step S332 in which all devices are maximally operated. In other words, the intake door 21 is opened, the defrost door 25 is fully opened, the air conditioner 23 is operated, the control mode is converted to a defrost mode, and an amount of air of the blower 22 is controlled to be a maximum value.

If the sensed relative humidity value is not greater than the value f at step S331, it is determined whether the sensed relative humidity value is greater than the value e and less than or equal to the value f at step S333. If the sensed relative humidity value is greater than the value e and less than or equal to the value f and at step S333, the amount of air of the blower 22 is decreased at step S334.

If the sensed relative humidity value is not greater than the value e and less than or equal to the value f and at step S333, it is determined whether the sensed relative humidity value is greater than the value b and less than or equal to the value e at step S335. If the sensed relative humidity value is greater than the value b and less than or equal to the value e at step S335, the defrost mode is released so that the mode door 24 returns to the FATC state, and an amount of air of the blower 22 is further decreased at step S336.

If the sensed relative humidity value is not greater than the value b and less than or equal to the value e at step S335, it is determined whether the sensed relative humidity value is greater than the value a and less than or equal to the value b at step S337. If the sensed relative humidity value is greater than the value a and less than or equal to the value b at step S337, the amount of air of the blower 22 is decreased to a minimum value so as to return to the FATC state, and the defrost door 25 is closed, at step S338.

If the sensed relative humidity value is not greater than the value a and less than or equal to the value b at step S337, it is determined whether the sensed relative humidity value is less than or equal to the value a at step S339. If the sensed relative humidity value is less than or equal to the value a at step S339, the air conditioner 23, the defrost door 25, and the intake door 21 are returned to the FATC state, and the controller 20 returns to the room temperature control mode, at step S40.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control method of an automatic defogging system of a vehicle when a window relative humidity in a passenger room increases and decreases, comprising:
    sensing a window relative humidity value through a defogging sensor installed on an inner surface of a window;
    comparing the sensed window relative humidity value to a preset reference value;
    removing humidity by selectively operating a selection mode of an air conditioning system based on the comparison of the sensed window relative humidity to the preset reference value; and
    controlling a temperature setting in the vehicle;
    wherein when the window relative humidity in the vehicle increases, removing said humidity comprises:
        opening an intake door and a defrost door, if the sensed value is greater than or equal to a value c and less than a value d;
        fully opening the defrost door, operating an air conditioner, and increasing an amount of air of a blower, if the sensed value is greater than or equal to the value d and less than a value g;
        converting a defrost mode and further increasing an amount of air of the blower, if the sensed value is greater than or equal to the value g and less than a value h;
        increasing maximally an amount of air of the blower, if the sensed value is greater than or equal to the value h; and
        returning to a room temperature control mode, if the sensed value is less than or equal to a value a, wherein the value a is 55 to 65%, the value c is 65 to 75%, the value d is 70 to 80%, the value g is 85 to 95%, and the value h is 90 to 100%.

2. A control method of an automatic defogging system of a vehicle when a window relative humidity in a passenger room increases and decreases, comprising:

sensing a window relative humidity value through a defogging sensor installed on an inner surface of a window;

comparing the sensed window relative humidity value to a preset reference value;

removing humidity by selectively operating a selection mode of an air conditioning system based on the comparison of the sensed window relative humidity to the preset reference value; and controlling a temperature setting in the vehicle;

wherein when the window relative humidity in the passenger room decreases, the removing humidity comprises:

opening an intake door and a defrost door, operating an air conditioner, and maximally increasing an amount of air of a blower in a defrost mode, if the sensed value is greater than a value f;

decreasing an amount of air of the blower, if the sensed value is less than or equal to the value f and greater than a value e;

returning to a fully automatic temperature control state by releasing the defrost mode and further decreasing an amount of air of the blower, if the sensed value is less than or equal to the value e and greater than a value b;

returning to the fully automatic temperature control state by minimizing an amount of air of the blower and closing the defrost door, if the sensed value is less than or equal to the value b and greater than a value a; and determining whether the sensed value is less than or equal to the value a, wherein the value a is about 55 to about 65%, the value b is about 60 to about 70%, the value e is about 75 to about 85%, and the value f is about 80 to about 90%.

* * * * *